(12) United States Patent
Song et al.

(10) Patent No.: US 12,511,073 B2
(45) Date of Patent: Dec. 30, 2025

(54) COARSE AND FINE PROGRAMMING OF NON-VOLATILE MEMORY CELLS

(71) Applicant: Silicon Storage Technology, Inc., San Jose, CA (US)

(72) Inventors: Yi Song, San Jose, CA (US); Jinho Kim, Saratoga, CA (US); Xian Liu, Sunnyvale, CA (US)

(73) Assignee: Silicon Storage Technology, Inc., San Jose, CA (US)

( * ) Notice: Subject to any disclaimer, the term of this patent is extended or adjusted under 35 U.S.C. 154(b) by 134 days.

(21) Appl. No.: 18/648,219

(22) Filed: Apr. 26, 2024

(65) Prior Publication Data

US 2025/0231705 A1 Jul. 17, 2025

Related U.S. Application Data

(60) Provisional application No. 63/620,687, filed on Jan. 12, 2024.

(51) Int. Cl.
*G11C 16/04* (2006.01)
*G06F 3/06* (2006.01)

(52) U.S. Cl.
CPC .......... *G06F 3/0655* (2013.01); *G06F 3/0604* (2013.01); *G06F 3/0673* (2013.01)

(58) Field of Classification Search
CPC ..... G06F 3/0655; G06F 3/0604; G06F 3/0673
See application file for complete search history.

(56) References Cited

U.S. PATENT DOCUMENTS

| | | |
|---|---|---|
| 5,029,130 A | 7/1991 | Yeh |
| 6,747,310 B2 | 6/2004 | Fan et al. |
| 6,855,980 B2 | 2/2005 | Wang et al. |
| 7,315,056 B2 | 1/2008 | Klinger |
| 7,868,375 B2 | 1/2011 | Liu et al. |

(Continued)

FOREIGN PATENT DOCUMENTS

JP 2003187588 7/2003

OTHER PUBLICATIONS

PCT Search Report & Written Opinion mailed on Jul. 4, 2024 corresponding to the related PCT Patent Application No. US2024/026889.

(Continued)

*Primary Examiner* — Pho M Luu
(74) *Attorney, Agent, or Firm* — DLA Piper LLP (US)

(57) ABSTRACT

A method of programming non-volatile memory cells comprising determining a target read current for respective ones of the memory cells based upon incoming data, associating respective ones of the memory cells with a respective one of a plurality of cell groups based upon the determined target read current for the respective memory cell being within a target read current range associated with the respective cell group, fast programming respective ones of the memory cells to a coarse target read current associated with the cell group to which the respective memory cell is associated, wherein the coarse target read current for respective ones of the cell groups is greater than the target read current range for the respective cell group, and then slow programming respective ones of the memory cells until the target read current determined for the respective memory cell is achieved.

18 Claims, 8 Drawing Sheets

(56) References Cited

U.S. PATENT DOCUMENTS

| | | | |
|---|---|---|---|
| 8,711,636 | B2 | 4/2014 | Do et al. |
| 8,908,441 | B1 | 12/2014 | Dutta et al. |
| 11,309,042 | B2 | 4/2022 | Markov |
| 2002/0036925 | A1 | 3/2002 | Tanzawa |
| 2004/0246798 | A1 | 12/2004 | Guterman |
| 2005/0083735 | A1 | 4/2005 | Chen et al. |
| 2007/0008775 | A1* | 1/2007 | Telecco .............. G11C 16/3477 365/185.29 |
| 2008/0175055 | A1 | 7/2008 | Kim |
| 2009/0296471 | A1 | 12/2009 | Goda |
| 2010/0259979 | A1 | 10/2010 | Jia |
| 2012/0008389 | A1 | 1/2012 | Kim |
| 2012/0113714 | A1 | 5/2012 | Choy |
| 2012/0269004 | A1 | 10/2012 | Kim et al. |
| 2013/0039130 | A1 | 2/2013 | Lee |
| 2014/0082440 | A1 | 3/2014 | Ho |
| 2016/0019948 | A1 | 1/2016 | Pang et al. |
| 2016/0077912 | A1 | 3/2016 | Mateescu |
| 2016/0293271 | A1 | 10/2016 | Won |
| 2017/0206981 | A1 | 7/2017 | Nafziger |
| 2017/0337466 | A1 | 11/2017 | Bayat |
| 2019/0139602 | A1 | 5/2019 | Tiwari |
| 2019/0206486 | A1* | 7/2019 | Tiwari .................. G11C 16/26 |
| 2020/0065023 | A1 | 2/2020 | Markov et al. |
| 2020/0348932 | A1* | 11/2020 | Zhang .................... G06F 13/10 |
| 2021/0019608 | A1 | 1/2021 | Tran |
| 2021/0065837 | A1 | 3/2021 | Markov et al. |
| 2021/0142156 | A1 | 5/2021 | Tran |
| 2022/0051739 | A1 | 2/2022 | Hwang |
| 2022/0415401 | A1 | 12/2022 | Park |
| 2022/0415417 | A1 | 12/2022 | Wang |

OTHER PUBLICATIONS

*Negative bias temperature instability: What do we understand?* By Dieter K. Schroder, in Microelectronics Reliability 47 (2007) 841-852, Department of Electrical Engineering and Center for Solid State Electronics Research, Arizona State University, Tempe, AZ 85287-5706, USA.

* cited by examiner

Block 1: For a plurality of memory cells to be programmed, determine a target read current Irtarget for respective ones of the memory cells based upon incoming data to be stored in the respective memory cell.

Block 2: Associate respective ones of the memory cells with one of a plurality of cell groups based on the target read current Irtarget determined for the respective memory cell being within a target read current range associated with the one cell group.

Block 3: (Coarse programming) Fast programming respective ones of the memory cells in a first program operation to a coarse target read current associated with the cell group to which the respective memory cell is associated.

Block 4: (Fine programming) Slow programming respective ones of the memory cells in a second program operation to the target read current Irtarget determined for the respective memory cell.

FIGURE 9

Block 1: For a plurality of memory cells to be programmed, determine a target read current Irtarget for respective ones of the memory cells based upon incoming data to be stored in the respective memory cell.

Block 2: Associate respective ones of the memory cells with one of a plurality of cell groups based on the target read current Irtarget determined for the respective memory cell being within a target read current range associated with the one cell group.

Block 3: (Coarse programming) Fast programming respective ones of the memory cells in a first program operation to a coarse target read current associated with the cell group to which the respective memory cell is associated.

Block 3A: Medium programming respective ones of the memory cells in a third program operation to a medium target read current associated with the cell group to which the respective memory cell is associated.

Block 4: (Fine programming) Slow programming respective ones of the memory cells in a second program operation to the target read current Irtarget determined for the respective memory cell.

FIGURE 11

COARSE AND FINE PROGRAMMING OF NON-VOLATILE MEMORY CELLS

RELATED APPLICATIONS

This application claims the benefit of U.S. Provisional Application No. 63/620,687, filed Jan. 12, 2024, and which is incorporated herein by reference.

FIELD OF THE INVENTION

The present invention relates to non-volatile memory cells of semiconductor devices, and more particularly to improving the efficiency and accuracy of programming non-volatile memory cells.

BACKGROUND OF THE INVENTION

Split-gate non-volatile memory semiconductor devices are well known in the art. See for example U.S. Pat. No. 7,868,375, which discloses a four-gate memory cell configuration, and which is incorporated herein by reference for all purposes. Specifically, FIG. 1 of the present disclosure illustrates a pair of split gate non-volatile memory cells 10 each with spaced apart source and drain regions 14/16 formed in a silicon semiconductor substrate 12. The source region 14 can be referred to as a source line SL (because it commonly is connected to other source regions for other non-volatile memory cells 10 in the same row or column), and the drain region 16 is commonly connected to a bit line. A channel region 18 of the substrate 12 extends between the source/drain regions 14/16. A floating gate 20 is disposed over (i.e., vertically over and laterally overlapping) and insulated from (and directly controls the conductivity of) a first portion of the channel region 18 (and partially over, and insulated from, the source region 14). A control gate 22 is disposed over, and insulated from, the floating gate 20. A select gate 24 (also referred to as a word line gate) is disposed over and insulated from (and directly controls the conductivity of) a second portion of the channel region 18. An erase gate 26 is disposed over and insulated from the source region 14 and is laterally adjacent to the floating gate 20. The erase gate 26 can include a notch that faces an edge of the floating gate 20.

A plurality of such memory cells 10 can be arranged in rows and columns to form a memory cell array, as illustrated in FIG. 2. While FIG. 1 only shows a pair of memory cells (sharing a common source region 14 and erase gate 26), the memory cell pairs can be placed end to end to form a column of memory cells 10 (where the memory cell pairs can share a common drain region 16). While only two such columns are shown in FIG. 2, there can be many such columns. Each column can include a bit line 16a electrically connecting together all the drain regions 16 in the column. Each row of memory cells 10 can include a control gate line 22a electrically connecting together all the control gates 22 in the row of memory cells 10. For example, all the control gates 22 in each row of memory cells 10 can be formed as a continuous line of conductive material, where a portion of the continuous line passing through any given memory cell 10 serves as its control gate 22. Each row of memory cells 10 can include a select gate line 24a electrically connecting together all the select gates 24 in the row of memory cells 10. For example, all the select gates 24 in each row of memory cells 10 can be formed as a continuous line of conductive material, where a portion of the continuous line passing through any given memory cell 10 serves as its select gate 24. Each row of memory cell pairs can include an erase gate line 26a electrically connecting together all the erase gates 26 in the row of memory cell pairs. For example, all the erase gates 26 in each row of memory cell pairs can be formed as a continuous line of conductive material, where a portion of the continuous line passing through any given memory cell pair serves as its erase gate 26. Finally, each row of memory cell pairs can include a source line 14a electrically connecting together all the source regions 14 in the row of memory cell pairs. For example, all the source regions 14 in each row of memory cell pairs can be formed as a continuous line of conductive diffusion in the substrate 12, where a portion of the continuous line passing through any given memory cell pair serves as its source region 14.

Various combinations of voltages are applied to the control gate 22, select gate 24, erase gate 26 and source and drain regions 14/16, to program the split gate non-volatile memory cell 10 (i.e., inject electrons onto the floating gate 20), to erase the split gate non-volatile memory cell 10 (i.e., remove electrons from the floating gate 20), and to read the split gate non-volatile memory cell 10 (i.e., measure or detect the conductivity of the channel region 18, by for example measuring or detecting a read current through the channel region 18, to determine the programming state of the floating gate 20).

Split gate non-volatile memory cell 10 can be operated in a digital manner, where the split gate non-volatile memory cell 10 is set to one of only two possible states: a programmed state and an erased state. The split gate non-volatile memory cell 10 is erased by placing a high positive voltage on the erase gate 26, and optionally a negative voltage on the control gate 22, to induce tunneling of electrons from the floating gate 20 to the erase gate 26 (leaving the floating gate 20 in a more positively charged state—the erased state). Split gate non-volatile memory cell 10 can be programmed by placing positive voltages on the control gate 22, erase gate 26, select gate 24 and source region 14, and a current on drain region 16. Electrons will then flow along the channel region 18 from the drain region 16 toward the source region 14, with electrons becoming accelerated and heated whereby some of them are injected onto the floating gate 20 by hot-electron injection (leaving the floating gate 20 in a more negatively charged state—the programmed state).

One technique to program the memory cells 10 is sequential programming, which involves applying the programming voltages as a series of pulses, with each pulse of programming voltages injecting more electrons onto the floating gate thus increasing the program state of the memory cell 10 with each pulse, until the desired programming state is achieved (i.e., until the desired read current for the desired programming state is achieved). With sequential programming, there can be intervening read operations between the programming pulses to determine if the desired programming state has been achieved by the last applied programming pulse (in which case programming ceases) or has not been achieved (in which case programming continues with one or more programming pulses). For example, each desired program state can be associated with a target read current Irtarget (i.e., the desired and therefore target current through the channel region 18 during a read operation that is associated with the desired program state). The higher the program state (i.e., the more electrons on the floating gate), the lower the read current Ir. Therefore, read current Ir will drop after each programming pulse. Once a target read current Irtarget is reached (reflecting the desired program state), programming for that memory cell 10 ceases.

If the same set of program voltages are applied during each pulse in sequential programming, the programming amount drops pulse to pulse, because as the floating gate becomes more negatively charged with each pulse, fewer electrons are injected onto the floating gate if the parameters of the programming pulses (applied voltages, supplied current, duration) remain constant. Therefore, when a memory cell 10 is determined to have not reached its desired programming state after any given pulse, one or more of the programming parameters can be stepped up to a higher value in the next pulse, to compensate for the dropping pulse-to-pulse programming amount that would otherwise occur. For example, for the memory cell 10 of FIG. 1, programming parameters that can be stepped up from one programming pulse to the next programming pulse can include increases in one or more of the following: voltage applied to the control gate, voltage applied to the erase gate, voltage applied to the source region, current supplied to the drain region, and duration of the programming pulse.

Split gate non-volatile memory cell 10 can be read by placing positive voltages on the select gate 24 (turning on the portion of channel region 18 under the select gate 24 by making it conductive) and drain region 16 (and optionally on the erase gate 26 and the control gate 22), and sensing current flow through the channel region 18. If the floating gate is positively charged (i.e. split gate non-volatile memory cell 10 is erased), the split gate non-volatile memory cell 10 will turn on because the both portions of the channel region 18 are conductive due to the lack of electrons on the floating gate 20, and electrical current will flow from drain region 16 to source region 14 (i.e. the split gate non-volatile memory cell 10 is sensed to be in its erased "1" state based on sensed current flow). If the floating gate 20 is negatively charged (i.e. split gate non-volatile memory cell 10 is programmed), the portion of channel region 18 under the floating gate is turned off (low conductivity), thereby preventing appreciable current flow (i.e., the split gate non-volatile memory cell 10 is sensed to be in its programmed "0" state based on no, or minimal, current flow). Memory cells 10 are considered non-volatile because they maintain their program state even when power is not applied to the semiconductor device. Memory cells 10 can be referred to as split gate non-volatile memory cells because two different gates (floating gate 20 and select gate 24), respectively, directly control the conductivity of two different portions of the channel region 18.

Split gate non-volatile memory cell 10 can alternately be operated in an analog manner where the program state (i.e. the amount of charge, such as the number of electrons, on the floating gate 20) of the split gate non-volatile memory cell 10 can be incrementally changed anywhere from a fully erased state (minimum number of electrons on the floating gate 20) to a fully programmed state (maximum number of electrons on the floating gate 20), or just a portion of this range. This means the split gate non-volatile memory cell 10 storage is analog, which allows for very precise and individual tuning of each split gate non-volatile memory cell 10 in an array of split gate non-volatile memory cells 10. Alternatively, the split gate non-volatile memory cell 10 could be operated as an MLC (multilevel cell) where it is configured to be programmed to one of many discrete values (such as 16 or 64 different values).

Split gate non-volatile memory cells with fewer gates are also known. For example, FIG. 3 illustrates known split gate non-volatile memory cells 10 that are the same as that of FIG. 1, except the control gates 22 are omitted. See for example U.S. Pat. No. 7,315,056, which is incorporated herein by reference for all purposes. Voltage coupling to the floating gate 20 provided by the control gate 22 of the split gate non-volatile memory cell of FIG. 1 is provided instead by the erase gate 26 and source region 14 of the split gate non-volatile memory cell 10 in FIG. 3. FIG. 4 illustrates an example layout of an array of the split gate non-volatile memory cells 10 of FIG. 3.

As another example, FIG. 5 illustrates known split gate non-volatile memory cells that are similar to that of FIG. 1, except the control gates 22 and the erase gates 26 are omitted. See for example U.S. Pat. No. 5,029,130, which is incorporated herein by reference for all purposes. The erase voltage for the split gate non-volatile memory cell 10 of FIG. 5 is applied to the select gate 24, which has a first portion laterally adjacent the floating gate 20, and a second portion that extends up and over the floating gate 20. FIG. 6 illustrates an example layout of an array of the split gate non-volatile memory cells 10 of FIG. 5.

As yet another example, FIG. 7 illustrates known split gate non-volatile memory cells 10 that are similar to that of FIG. 5, except a conductive block of material 28 is formed in contact with source region 14, to serve as an extended source line. See for example U.S. Pat. No. 6,855,980, which is incorporated herein by reference for all purposes. An example layout for an array of the split gate non-volatile memory cells 10 of FIG. 7 can be the same as that in FIG. 6.

One issue that arises is how best to efficiently program multiple memory cells at the same time, even though the memory cells are to be programmed to different program states. For example, it is known to simultaneously program an entire row of memory cells at the same time. Once a memory cell in the row reaches its desired program state (confirmed by the intervening read operation), the voltage on the corresponding bit line is raised to what is referred to as an inhibit voltage (to inhibit further programming), so that the voltage differential between the memory cell's source and drain regions is insufficient to allow further programming even though subsequent programming pulses are applied to the row of memory cells. Ceasing programming of the memory cells in the row can be individually implemented, because each memory cell in the row is connected to a different bit line. Once all the memory cells in the row reach their desired program state, then programming ceases.

One problem with sequential programming in analog or MLC operations is overshoot, where a given programming pulse over-programs the memory cell. If this occurs, the entire row of memory cells may need to be erased (because they all share a common erase gate line 26a), and programming may start over, which is wasteful. To prevent program overshoot (and thus increase program accuracy), the amount of programming per pulse can be kept smaller (e.g., by reducing step up increases in any programming parameter(s) after each programming pulse). However, this means that an excessive number of programming pulses may be needed for those memory cells being programmed to higher programming states, thus increasing programming time and thus decreasing program efficiency. An excessive number of programming pulses also can cause program disturb, where the programming state of a memory cell that has reached its desired programming state is undesirably incrementally further programmed by too many subsequent programming pulses even though the inhibit voltage on the respective bit line is used to prevent further programming. This issue is most problematic for memory cells being programmed to the lower program states. In the alternative, using larger step up increases in programming parameter(s) to speed up programming and increase program efficiency would result in an increase in the rate of overshoot and therefore a decrease in accuracy. There is a need for increasing program efficiency without unduly decreasing program accuracy.

BRIEF SUMMARY OF THE INVENTION

The aforementioned problems and needs are addressed by a method of programming non-volatile memory cells, comprising determining a target read current for respective ones of the non-volatile memory cells based upon incoming data to be stored in the respective non-volatile memory cell, associating respective ones of the non-volatile memory cells with a respective one of a plurality of cell groups based upon the determined target read current for the respective non-volatile memory cell being within a target read current range associated with the respective cell group, wherein the target read current ranges for the respective cell groups are different from each other, fast programming respective ones of the non-volatile memory cells in a first program operation to a coarse target read current associated with the cell group to which the respective non-volatile memory cell is associated, wherein the coarse target read current for respective ones of the cell groups is greater than the target read current range for the respective cell group, and after the fast programming, slow programming respective ones of the non-volatile memory cells in a second program operation until the target read current determined for the respective non-volatile memory cell is achieved. The slow programming programs the non-volatile memory cells at a rate less than that of the fast programming.

A semiconductor device comprises a plurality of non-volatile memory cells and control circuitry to determine a target read current for respective ones of the non-volatile memory cells based upon incoming data to be stored in the respective non-volatile memory cell, associate respective ones of the non-volatile memory cells with a respective one of a plurality of cell groups based upon the determined target read current for the respective non-volatile memory cell being within a target read current range associated with the respective cell group, wherein the target read current ranges for the respective cell groups are different from each other, fast program respective ones of the non-volatile memory cells in a first program operation to a coarse target read current associated with the cell group to which the respective non-volatile memory cell is associated, wherein the coarse target read current for respective ones of the cell groups is greater than the target read current range for the respective cell group, after the fast program, slow program respective ones of the non-volatile memory cells in a second program operation until the target read current determined for the respective non-volatile memory cell is achieved. The slow program to program the non-volatile memory cells at a rate less than that of the fast program.

Other objects and features of the present disclosure will become apparent by a review of the specification, claims and appended figures.

BRIEF DESCRIPTION OF THE DRAWINGS

FIG. 9 is a flow diagram illustrating the blocks for coarse (fast) and fine (slow) programming of memory cells.

FIG. 11 is a flow diagram illustrating the blocks for coarse (fast), medium, and fine (slow) programming of memory cells.

DETAILED DESCRIPTION OF THE INVENTION

Figure 1:
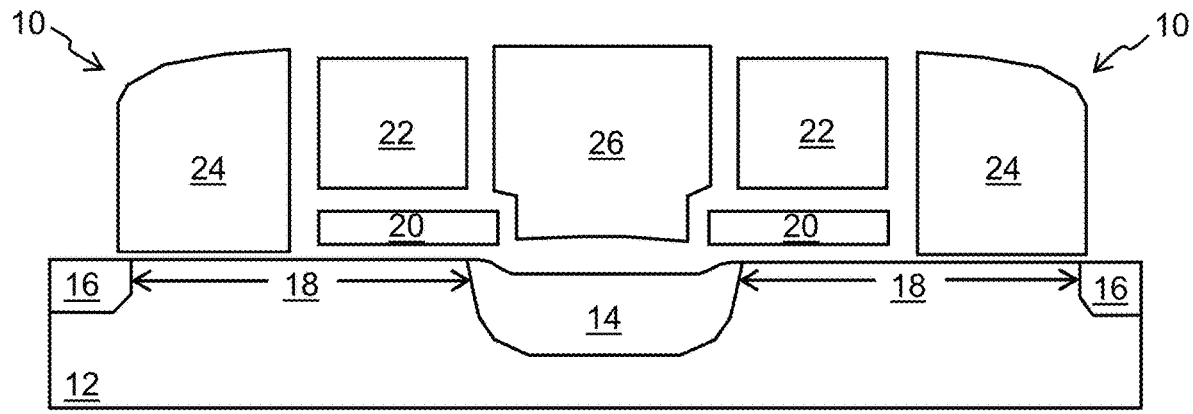
FIG. 1 is a side cross sectional view of a conventional pair of memory cells.
Figure 2:
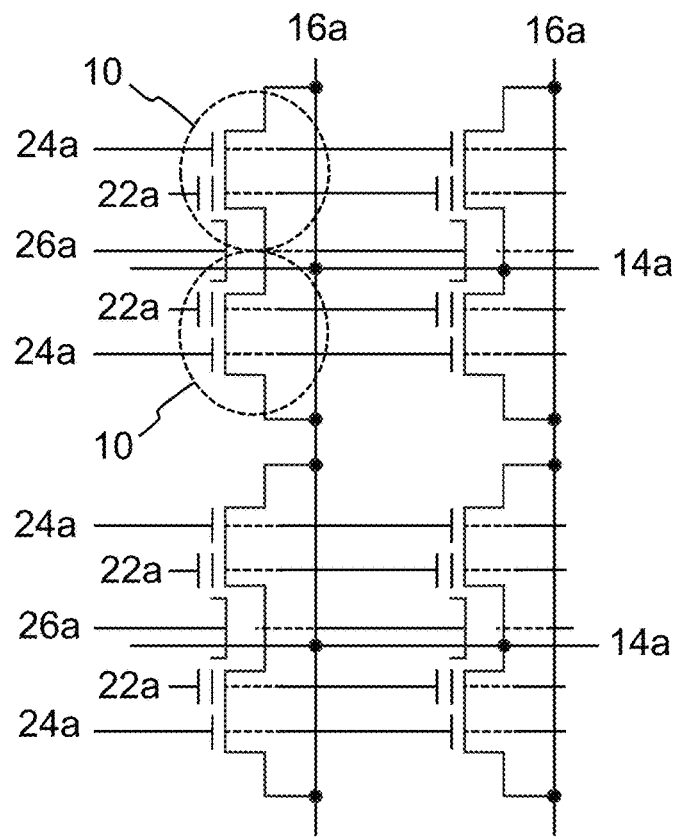
FIG. 2 is a schematic and layout diagram of a conventional memory cell array of the memory cells of FIG. 1.
Figure 3:
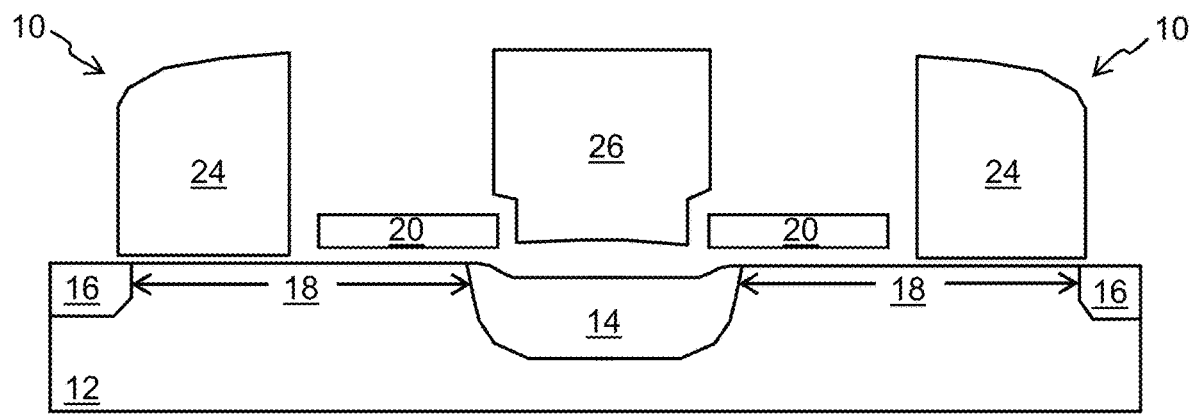
FIG. 3 is a side cross sectional view of a conventional pair of memory cells.
Figure 4:
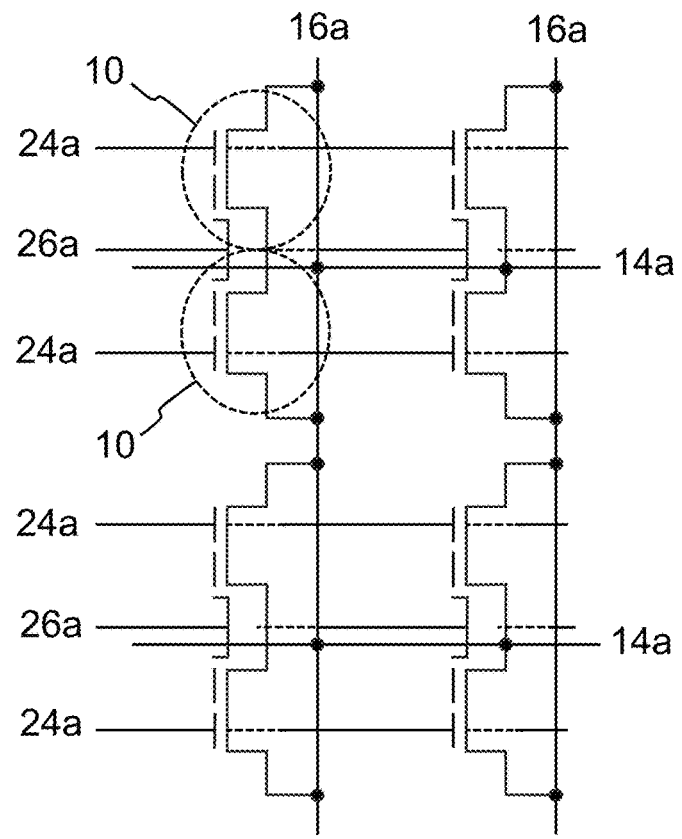
FIG. 4 is a schematic and layout diagram of a conventional memory cell array of the memory cells of FIG. 3.
Figure 5:
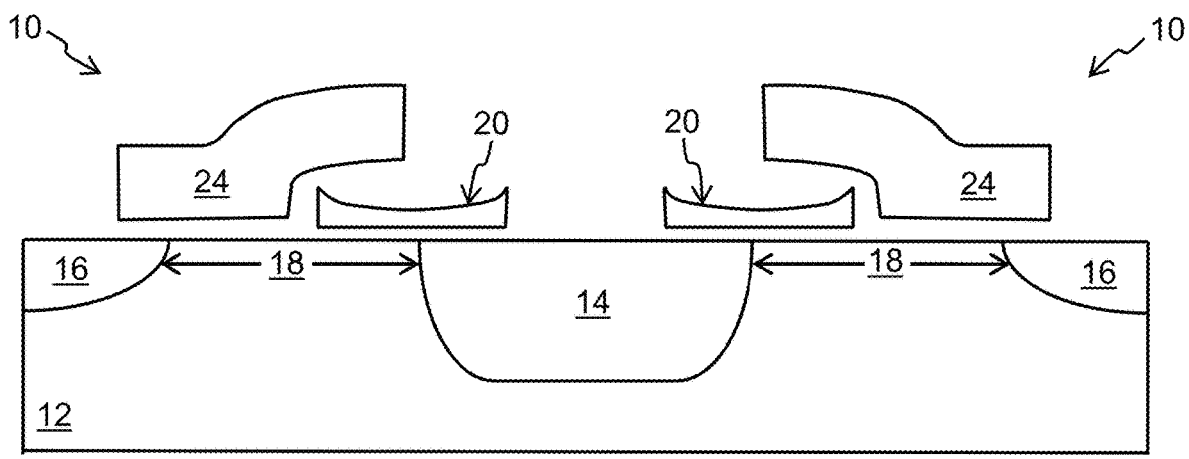
FIG. 5 is a side cross sectional view of a conventional pair of memory cells.
Figure 6:
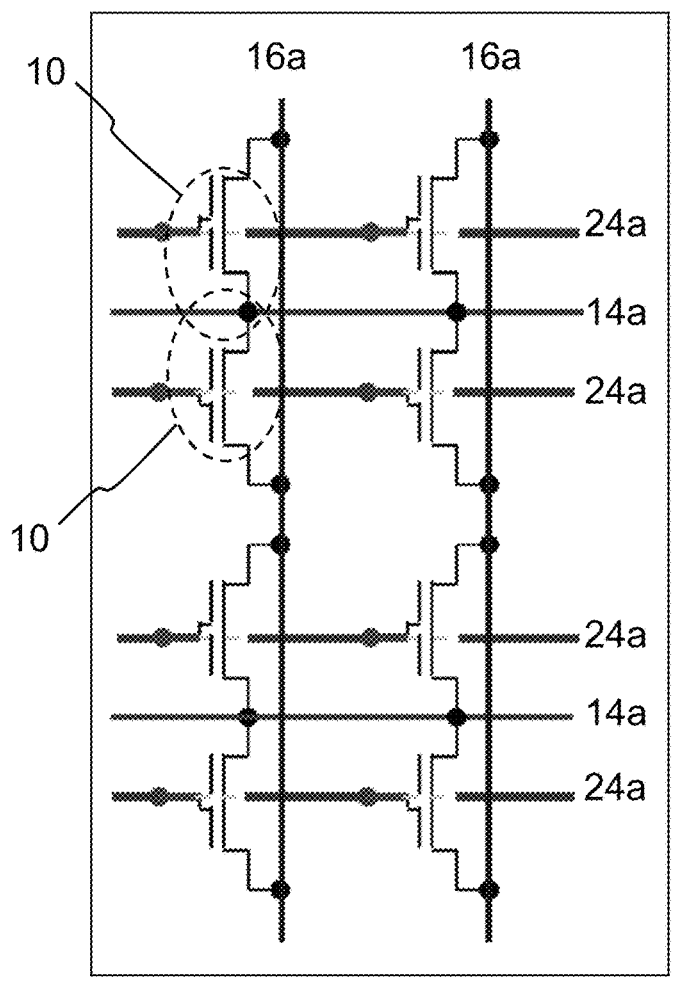
FIG. 6 is a schematic and layout diagram of a conventional memory cell array of the memory cells of FIG. 5.
Figure 7:
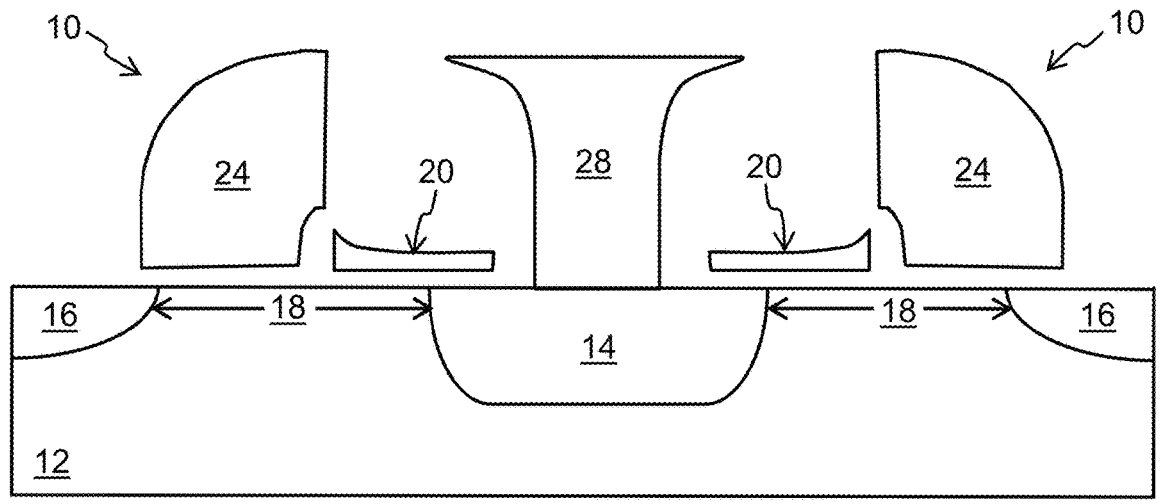
FIG. 7 is a side cross sectional view of a conventional pair of memory cells.
Figure 8:
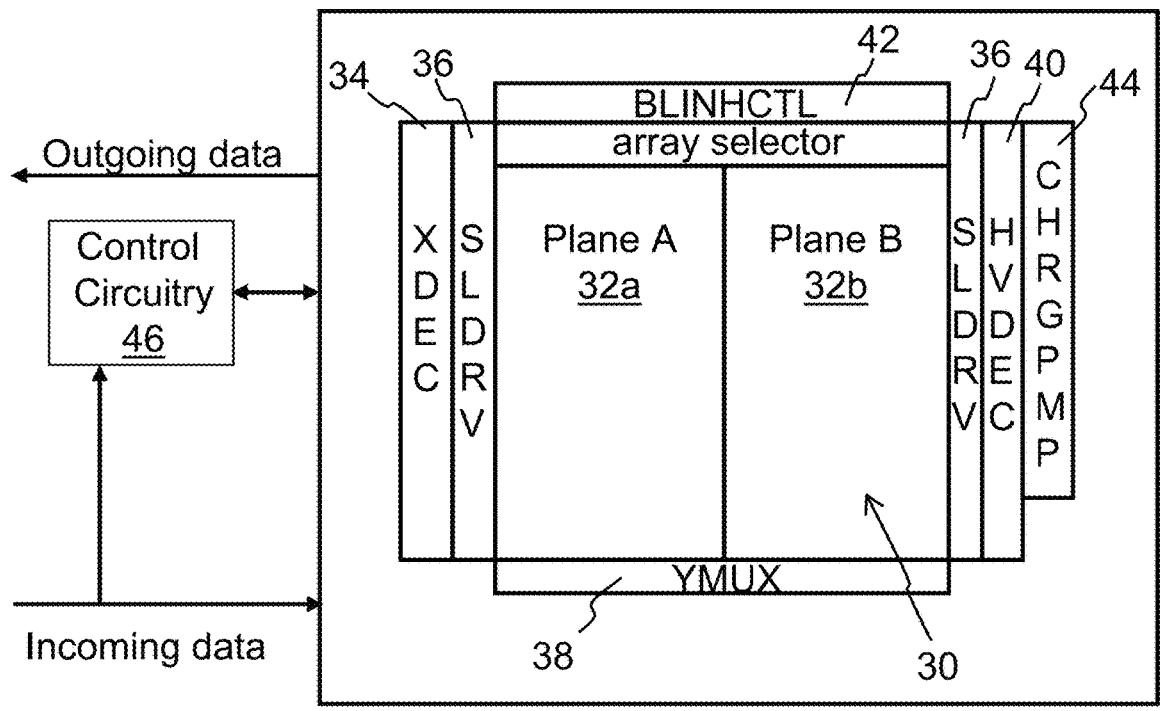
FIG. 8 is a diagram illustrating the components of a semiconductor device.

The present examples illustrate a memory cell programming method for increasing program efficiency without unduly decreasing program accuracy. The programming method can be implemented as part of control circuitry 46, which controls the various device elements for a memory array, which can be better understood from the architecture of an example semiconductor device as illustrated in FIG. 8. The semiconductor device includes an array 30 of non-volatile memory cells 10, which can be segregated into two separate planes (Plane A 32a and Plane B 32b). The non-volatile memory cells can be of the type shown in FIG. 1, 3, 5 or 7, arranged in a plurality of rows and columns in the semiconductor substrate 12 as illustrated in FIG. 2, 4 or 6, and thus formed on a single chip. Alternately, the non-volatile memory cells can have a stacked gate structure, which is similar to that shown in FIG. 5, but where the floating gate 20 extends entirely across (and controls the conductivity of) channel region 18, and a control gate is disposed vertically over the floating gate 20. Adjacent to the array of array 30 of split gate non-volatile memory cells 10 are an address decoder 34 (e.g., XDEC), source line drivers 36 (e.g., SLDRV), a column decoder 38 (e.g., YMUX), a high voltage row decoder 40 (e.g., HVDEC), a bit line controller 42 (e.g., BLINHCTL), and a charge pump 44 (e.g., CHRGPMP) which are used to decode addresses and supply the various voltages to the various gates and regions of the split gate non-volatile memory cells 10 during read, program, and erase operations for selected split gate non-volatile memory cells 10 of the array 30, under the control of the control circuitry 46. Column decoder 38 includes a sense amplifier containing circuitry for measuring the currents on the bit lines during a read operation. Control circuitry 46 controls the various device elements to implement each operation (program, erase, read) on selected split gate non-volatile memory cells 10 of the array 30 as described herein. Control circuitry 46 operates the semiconductor device to program, erase and read the selected split gate non-volatile memory cells 10 of the array 30. As part of these operations, the control circuitry 46 can be provided with access to incoming data which is data to be programmed to the selected split gate non-volatile memory cells 10 of the array 30, along with program, erase and read commands provided on the same or different lines. Data read from the array 30 (i.e., from selected split gate non-volatile memory cells 10 of the array 30) is provided as outgoing data.

The programming method involves the control circuitry 46 implementing memory cell programming. Thus, control circuitry 46 may be loaded with software, i.e. non-transitory electronically readable instructions, or firmware, or can consist of respective circuits, or any combination thereof, to perform the methods described herein. Control circuitry 46 may be implemented by a microcontroller, dedicated circuitry, a processor, a general purpose processor running firmware or software, or a combination thereof.

In operation, programming can be performed by applying the programming voltages in discrete pulses, with intervening read operations to verify the programming state between programming pulses (i.e., sequential programming). Specifically, after each program pulse, a program verify read operation may be performed to determine if the selected cells have reached their respective target program state (i.e., reached their target read current Irtarget associated with the target program state). If the determination is yes for any given memory cell, then a program inhibit voltage can be applied for that given memory cell so that subsequent program pulses for the other cells do not further program the given memory cell. For example, once a memory cell in a particular row is determined to have achieved its desired program state, a program inhibit voltage can be applied to the corresponding bit line to prevent further programming of that memory cell. Memory cells determined to have not reached their desired program states are programmed with additional program pulses (also referred to as a program retry pulse train), often with a step-up in program parameter(s). The program retry pulse train continues until all the memory cells in the row to be programmed have reached their target program states.

The memory cell program method is ideal for programming a plurality of memory cells that are in one of the rows of memory cells (which could involve only some of the memory cells in the row, or all of the memory cells in the row) by first using a faster coarse programming, followed by a slower fine programming, during a single program operation that programs the plurality of memory cells to different program states to store incoming data. Each data value of the incoming data is associated with one of the possible program states and thus a corresponding target read current Irtarget. For brevity, the following non-limiting example is described with respect to target read currents Irtarget. In this example, the semiconductor device is operating in MLC mode, with ten possible different and discrete target read currents Irtarget for storing the incoming data: 10 nA, 20 nA, 30 nA, 40 nA, 50 nA, 60 nA, 70 nA, 80 nA, 90 nA, and 100 nA. Also in this example, there are three cell groups: Cell Group 1, Cell Group 2 and Cell Group 3, with each cell group associated with a different range of target read currents. In this example, Cell Group 1 is associated with a range of nA-30 nA, Cell Group 2 is associated with a range of 40-60 nA, and Cell Group 3 is associated with a range of 70 nA-100 nA. Therefore, memory cells to be programmed to achieve a target read current Irtarget of 10 na, 20 nA or 30 nA, are associated with Cell Group 1. Memory cells to be programmed to achieve a target read current Irtarget of 40 nA, 50 nA or 60 nA, are associated with Cell Group 2. Memory cells to be programmed to achieve a target read current Irtarget of 70 na, 80 nA, 90 nA or 100 nA, are associated with Cell Group 3. Programming the memory cells varies depending on which cell group respective ones of the memory cells belong, as detailed below. The use of three cell groups is for illustrative purposes only, and is not meant to be limiting in any way.

The method begins at Block 1 as shown in FIG. 9, where for a plurality of memory cells to be programmed, a target read current, Irtarget, for respective ones of the memory cells is determined based upon incoming data to be stored in the memory cell. At Block 2, respective ones of the memory cells are associated with one of a plurality of cell groups based on the target read current Irtarget, which as indicated above is based on a target programming state, for the memory cell (i.e., where the target read current Irtarget corresponds to the data being stored in that memory cell), where each cell group is associated with a different target read current Irtarget range. In the present non-limiting example, memory cells to be programmed to a target read current Irtarget of 10 na, 20 nA or 30 nA are associated with Cell Group 1 (which for this example is associated with a target read current range of 10 nA-30 nA). Memory cells to be programmed to a target read current Irtarget of 40 na, 50 nA or 60 nA are associated with Cell Group 2 (which for this example is associated with a target read current range of 40 nA-60 nA). Memory cells to be programmed to a target read current Irtarget of 70 na, 80 nA, 90 nA or 100 nA are associated with Cell Group 3 (which for this example is associated with a target read current range of 70 nA-100 nA).

At Block 3, coarse programming is performed, where memory cells in the respective cell groups are subject to fast programming in a first program operation until the respective memory cells in the respective cell group reach a coarse target read current Irct associated with their cell group. Specifically, each cell group is associated with a respective coarse target read current Irct, which is higher than the range of target read currents for the memory cells in the cell group. In the present non-limiting example, Cell Group 1, which is associated with a target read current range 10 nA-30 nA, can be associated with a coarse target read current Irct of 50 nA. Cell Group 2, which is associated with a target read current range nA-60 nA, can be associated with a coarse target read current Irct of 80 nA. Cell Group 3, which is associated with a target read current range 70 nA-100 nA, can be associated with a coarse target read current Irct of 120 nA. This means that a coarse target read current Irct for any given cell group can be within the target read current range of an adjacent cell group (i.e., the coarse target read current Irct of Group 1 can be within the target current range of Group 2, and the coarse target read current Irct of Group 2 can be within the target current range of Group 3). Sequential programming, using pulses of applied voltages with intervening read operations, can be used for the coarse programming, which continues for each memory cell in the row until it reaches the coarse target read current Irct for the cell group to which the memory cell belongs. Because the coarse target read current Irct for any given memory cell is above the target read current to which it will be programmed, sequential programming with one or more programming parameters stepped up in amplitude from pulse-to-pulse can be used without excessive risk of over programming.

At Block 4, fine programming is performed, where memory cells in all cell groups are subjected to slow programming in a second program operation until the respective memory cells reach their respective target read currents Irtarget. Slow programming means that in the sequential programming in Block 4, one or more of the programming parameters, or step up increase(s) in one or more of such programming parameters, or both, is or are less than that for the fast programming of Block 3, so that the rate of programming (i.e., the rate at which electrons are injected onto the floating gate) is less during the slow programming of Block 4 relative to the fast programming of Block 3. Therefore, during the fine (slow) programming of Block 4, the rate of programming is slowed or reduced relative to the coarse (fast) programming of Bock 3 to reduce the risk of any over programming. The fine (slow) programming, with intervening read operations, can continue for each memory cell until it reaches its target read current Irtarget. At this point, programming is stopped either by ceasing the programming pulses, or by providing an inhibit voltage on the bit line for that memory cell so that subsequent program pulses for programming other memory cells do not further program the memory cell.

In a non-limiting example, the fast programming can include applying a plurality of first program pulses to the non-volatile memory cells, with intervening read operations, where the first program pulses include a program voltage of 6V with a step size of 0.1V (i.e., the first pulse includes a program voltage of 6V, the second pulse includes a program voltage of 6.1V, and so on), a program current of 0.1 mA, and a duration of 20 us for each first program pulse. The slow programming can include applying a plurality of second program pulses to the non-volatile memory cells, with intervening read operations, where the second program pulses include a program voltage of 7V (with step size of 0.05V), a program current of 0.01 mA, and a duration of 10 us for each second program pulse.

Figure 10:
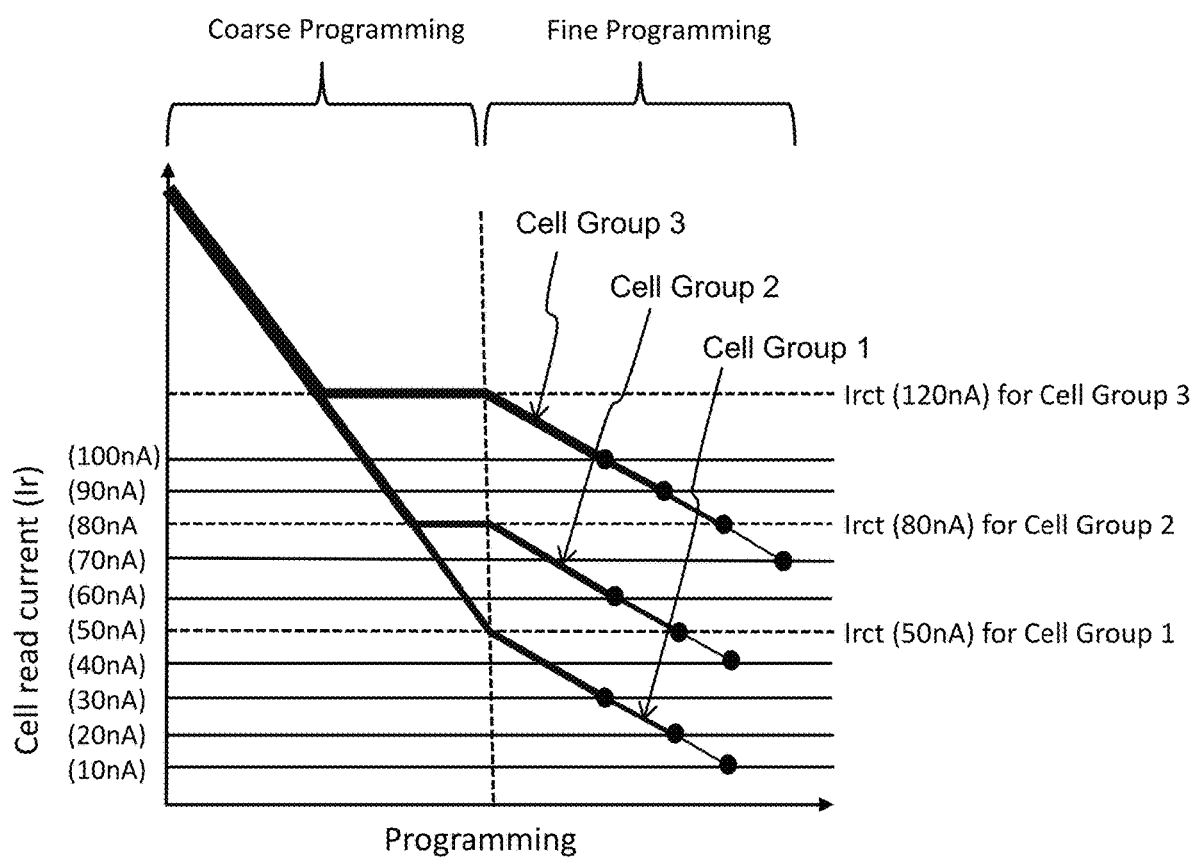
FIG. 10 is a graph illustrating the coarse (fast) and fine (slow) programming.

FIG. 10 graphically illustrates the coarse (fast) and fine (slow) programming of the memory cells in the above non-limiting example, wherein the x-axis represents time (or programming pulses) and the y-axis represent cell read current, Ir. The rate of programming during coarse (fast) programming is greater than that relative to during fine (slow) programming, for program efficiency. The rate of programming during fine (slow) programming is lower relative than that relative to coarse (fast) programming, for program accuracy. Together, the coarse and fine programming, using different coarse target read currents Irct for different cell groups of memory cells to be programmed to different ranges of program states, is faster and more accurate than conventional programming techniques. The coarse (fast) programming is used for better program efficiency and reduced program disturb (by reducing the number of overall programming pulses), and the fine programming is used for better accuracy (by reducing overshoot in programming, and resulting in the distribution of actual read currents being closer to the respective target read currents for the various memory cells).

Figure 12:
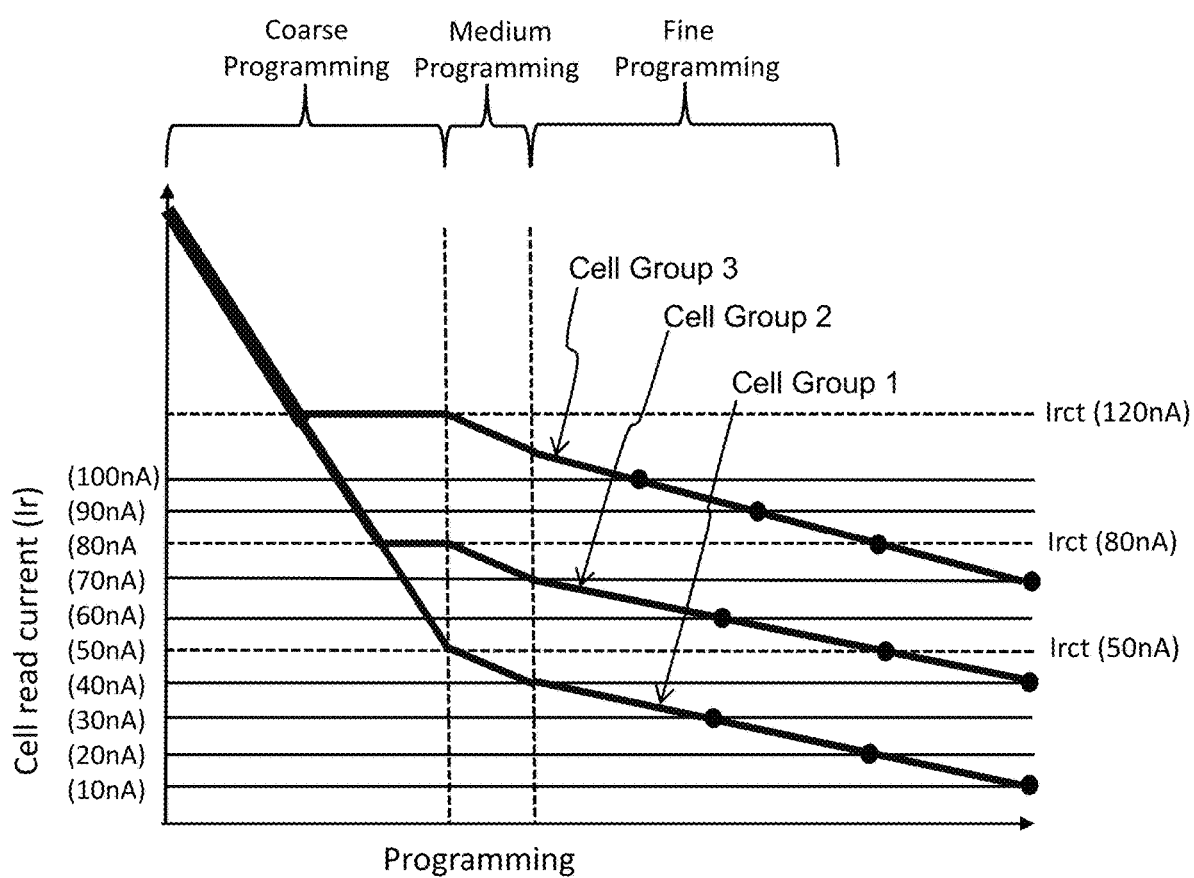
FIG. 12 is a graph illustrating the coarse (fast), medium, and fine (slow) programming.

While the above method is described with respect to two blocks of programming (coarse, fine), more than two blocks of programming can be utilized, with each subsequent block of programming having a reduced rate of programming relative to the previous block. For example, three blocks of programming can be used (coarse, medium and fine), as illustrated in FIG. 11 (with medium programming in Block 3A added between the coarse and fine programming) and in FIG. 12 (showing the three rates of programming). In the medium programming of block 3A respective ones of the memory cells are programmed in a third program operation to a medium target read current associated with the cells group to which the respective memory cell is associated. Thus, the medium programming of block 3A involves programming each cell group to its respective medium target read current, where the medium target read current for respective ones of the cell groups is less than the coarse target read current for the respective cell group and greater than the target read current range for the respective cell group. Any number of such programming blocks can be utilized between the coarse and fine programming blocks. The term third program operation is meant to distinguish from the first and second program operation and is not meant to indicate an order.

It is to be understood that the above is not limited to the examples(s) described above and illustrated herein but encompasses any and all variations falling within the scope of any claims. For example, while the above method is described using three cell groups, two cell groups, or more than three cell groups, can also be used. Any references to the examples or invention herein are not intended to limit the scope of any claim or claim term, but instead merely relate to one or more features that may be covered by one or more of the claims. Materials, processes and numerical examples described above are examples only, and should not be deemed to limit the claims.

What is claimed is:

1. A method of programming non-volatile memory cells, comprising:
   determining a target read current for respective ones of the non-volatile memory cells based upon incoming data to be stored in the respective non-volatile memory cell;
   associating respective ones of the non-volatile memory cells with a respective one of a plurality of cell groups based upon the determined target read current for the respective non-volatile memory cell being within a target read current range associated with the respective cell group, wherein the target read current ranges for the respective cell groups are different from each other;
   fast programming respective ones of the non-volatile memory cells in a first program operation to a coarse target read current associated with the cell group to which the respective non-volatile memory cell is associated, wherein the coarse target read current for respective ones of the cell groups is greater than the target read current range for the respective cell group; and
   after the fast programming, slow programming respective ones of the non-volatile memory cells in a second program operation until the target read current determined for the respective non-volatile memory cell is achieved;
   wherein the slow programming programs the non-volatile memory cells at a rate less than that of the fast programming.

2. The method of claim 1, wherein the fast programming comprises:
   applying a plurality of first program pulses to the non-volatile memory cells, with intervening read operations.

3. The method of claim 2, wherein the slow programming comprises:
   applying a plurality of second program pulses to the non-volatile memory cells, with intervening read operations.

4. The method of claim 1, comprising:
   medium programming respective ones of the non-volatile memory cells in a third program operation to a medium target read current associated with the cell group to which the respective non-volatile memory cell is associated, wherein:
      the medium target read current for respective ones of the cell groups is less than the coarse target read current for the respective cell group and greater than the target read current range for the respective cell group, the medium programming is after the fast programming and before the slow programming, and the medium programming programs the non-volatile memory cells at a rate less than that of the fast programming but greater than that of the slow programming.

5. The method of claim 1, wherein:
the plurality of cell groups comprises at least a first cell group and a second cell group;
the first cell group is associated with a first target read current range;
the second cell group is associated with a second target read current range that is greater than the first target read current range; and
the coarse target read current associated with the first cell group is within the second target read current range.

6. The method of claim 1, wherein:
the plurality of cell groups comprises at least a first cell group, a second cell group and a third cell group;
the first cell group is associated with a first target read current range;
the second cell group is associated with a second target read current range that is greater than the first target read current range;
the third cell group is associated with a third target read current range that is greater than the second target read current range;
the coarse target read current associated with the first cell group is within the second target read current range; and
the coarse target read current associated with the second cell group is within the third target read current range.

7. The method of claim 1, wherein respective ones of the non-volatile memory cells comprises:
a source region and drain region formed in a semiconductor substrate, with a channel region of the semiconductor substrate extending between the source region and the drain region;
a floating gate disposed over and insulated from a first portion of the channel region; and
a select gate disposed over and insulated from a second portion of the channel region.

8. The method of claim 7, wherein respective ones of the non-volatile memory cells comprises:
an erase gate disposed over and insulated from the source region.

9. The method of claim 8, wherein respective ones of the non-volatile memory cells comprises:
a control gate disposed over and insulated from the floating gate.

10. A semiconductor device, comprising:
a plurality of non-volatile memory cells; and
control circuitry to:
determine a target read current for respective ones of the non-volatile memory cells based upon incoming data to be stored in the respective non-volatile memory cell;
associate respective ones of the non-volatile memory cells with a respective one of a plurality of cell groups based upon the determined target read current for the respective non-volatile memory cell being within a target read current range associated with the respective cell group, wherein the target read current ranges for the respective cell groups are different from each other;
fast program respective ones of the non-volatile memory cells in a first program operation to a coarse target read current associated with the cell group to which the respective non-volatile memory cell is associated, wherein the coarse target read current for respective ones of the cell groups is greater than the target read current range for the respective cell group; and
after the fast program, slow program respective ones of the non-volatile memory cells in a second program operation until the target read current determined for the respective non-volatile memory cell is achieved;
wherein the slow program to program the non-volatile memory cells at a rate less than that of the fast program.

11. The semiconductor device of claim 10, wherein the fast program comprises a plurality of first program pulses applied to the non-volatile memory cells, with intervening read operations.

12. The semiconductor device of claim 11, wherein the slow program comprises a plurality of second program pulses applied to the non-volatile memory cells, with intervening read operations.

13. The semiconductor device of claim 10, wherein the control circuitry to:
medium program respective ones of the non-volatile memory cells in a third program operation to a medium target read current associated with the cell group to which the respective non-volatile memory cell is associated, wherein:
the medium target read current for respective ones of the cell groups is less than the coarse target read current for the respective cell group and greater than the target read current range for the respective cell group,
the medium program is after the fast program and before the slow program, and
the medium program to program the non-volatile memory cells at a rate less than that of the fast program but greater than that of the slow program.

14. The semiconductor device of claim 10, wherein:
the plurality of cell groups comprises at least a first cell group and a second cell group;
the first cell group is associated with a first target read current range;
the second cell group is associated with a second target read current range that is greater than the first target read current range; and
the coarse target read current associated with the first cell group is within the second target read current range.

15. The semiconductor device of claim 10, wherein:
the plurality of cell groups comprises at least a first cell group, a second cell group and a third cell group;
the first cell group is associated with a first target read current range;
the second cell group is associated with a second target read current range that is greater than the first target read current range;
the third cell group is associated with a third target read current range that is greater than the second target read current range;
the coarse target read current associated with the first cell group is within the second target read current range; and the coarse target read current associated with the second cell group is within the third target read current range.

16. The semiconductor device of claim 10, wherein respective ones of the non-volatile memory cells comprises:
   a source region and drain region formed in a semiconductor substrate, with a channel region of the semiconductor substrate extending between the source region and the drain region;
   a floating gate disposed over and insulated from a first portion of the channel region; and
   a select gate disposed over and insulated from a second portion of the channel region.

17. The semiconductor device of claim 16, wherein respective ones of the non-volatile memory cells comprises:
   an erase gate disposed over and insulated from the source region.

18. The semiconductor device of claim 17, wherein respective ones of the non-volatile memory cells comprises:
   a control gate disposed over and insulated from the floating gate.

* * * * *